United States Patent
Cordebar et al.

(10) Patent No.: US 6,926,349 B2
(45) Date of Patent: Aug. 9, 2005

(54) MOUNT FOR SECURING A PART TO A SUPPORT AND FOR POSITIONING IT RELATIVE TO ITS SURROUNDINGS, IN PARTICULAR A MOTOR VEHICLE BODYWORK PART

(75) Inventors: Francis Cordebar, Lagnieu (FR); Pascal Barbier, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/320,370

(22) Filed: Dec. 17, 2002

(65) Prior Publication Data

US 2003/0155788 A1 Aug. 21, 2003

(30) Foreign Application Priority Data

Dec. 19, 2001 (FR) ............................................. 01 16499

(51) Int. Cl.[7] ................................................ B23P 21/00
(52) U.S. Cl. ........................... 296/191; 296/198; 29/469
(58) Field of Search ............................. 296/29, 187.01, 296/191, 198, 207; 294/154; 248/548; 403/28; 52/573.1; 29/469; 293/154

(56) References Cited

U.S. PATENT DOCUMENTS

| 5,098,765 A | * | 3/1992 | Bien | .......................... 428/134 |
|---|---|---|---|---|
| 5,242,200 A | * | 9/1993 | Kamm et al. | ................ 296/154 |
| 5,584,528 A | * | 12/1996 | Cozzani | ....................... 296/207 |

FOREIGN PATENT DOCUMENTS

| DE | 3304569 | * | 7/1984 | ................. 296/191 |
|---|---|---|---|---|
| EP | 0 612 635 A1 | | 8/1994 | |
| EP | 1 070 639 A1 | | 1/2001 | |
| FR | 2 806 133 A | | 9/2001 | |
| GB | 2 281 260 A | | 3/1995 | |

* cited by examiner

Primary Examiner—Dennis H. Pedder
(74) Attorney, Agent, or Firm—Oliff & Berridge, PLC

(57) ABSTRACT

The invention relates to a mount for securing a part to a support and for enabling the part to be positioned relative to its surroundings. The mount comprises:

- two pieces (6, 20) that are movable relative to each other parallel to a positioning axis (Y), one piece being for securing to the part and the other to the support;
- retaining means (22a, 26, 28) which prevent the two moving pieces from moving relative to each other and which release them only when the part (2) exerts against the support (4) a force that is greater than a given threshold in a direction parallel to the positioning axis; and
- locking means (31) suitable for being actuated to prevent the two moving pieces from moving relative to each other.

The invention also provides a method of assembling a part to a support by means of such a mount.

3 Claims, 4 Drawing Sheets

MOUNT FOR SECURING A PART TO A SUPPORT AND FOR POSITIONING IT RELATIVE TO ITS SURROUNDINGS, IN PARTICULAR A MOTOR VEHICLE BODYWORK PART

The present invention relates to a mount for securing a part to a support and for positioning it relative to its surroundings, in particular a motor vehicle bodywork part.

The bodywork parts of a motor vehicle are traditionally fixed to the structure of the vehicle via separate fastening pieces. Bodywork parts made of sheet metal are mounted on the structure prior to the vehicle passing through the paint shop, while parts made of plastics materials which cannot withstand being raised to a temperature of about 180° C. for any length of time are assembled after painting to the structure that already supports said other parts.

Such mounts present problems of ensuring that the various bodywork parts are properly positioned relative to one another, in particular since parts made of plastics material are the subject of thermal expansion that cannot be ignored.

That is why sliding mounts are used which allow bodywork parts made of plastics material a degree of freedom in the longitudinal direction of the vehicle so as to leave them free to lengthen without generating stresses that might deform them.

In any event, the mounts must be adjustable so that the bodywork parts can be positioned relative to one another, essentially by adjusting the distance between each part and its support.

However, such adjustable mounts, whether sliding or otherwise, always require numerous handling operations while the bodywork parts they support are being put into place.

For example, an adjustable mount used for securing a front fender to the structure of the vehicle requires the following operations to be performed:
 securing the mount to the fender;
 closing the hood so as to present the fender in its final mounting position while simultaneously positioning it correctly relative to the hood;
 clamping the mount partially so as to hold the fender temporarily in this position;
 opening the hood to give access to the means for clamping the mount;
 clamping the mount so as to lock the fender definitively in position; and
 closing the hood.

Under the above circumstances, the operation of partially clamping the mount requires clamping means to be accessed while the hood is closed, and such access is generally quite difficult, which explains why the clamping performed at this stage is only partial and why it is necessary to open the hood in order to provide access with the mount being finally clamped subsequently.

Consequently, the need to position a fender on a vehicle assembly line is expensive in terms of labor.

The present invention seeks to propose a novel adjustable mount which makes it easier to position a bodywork part, even when no access is possible to its clamping means while the part is being positioned.

In a first aspect, the present invention provides a mount for securing a part to a support and for positioning it relative to its surroundings, the mount being characterized in that it comprises:
 two pieces that are movable relative to each other parallel to a positioning axis, one piece being for securing to the part and the other to the support;
 retaining means which prevent the two moving pieces from moving relative to each other and which release them only when the part exerts against the support a force that is greater than a given threshold in a direction parallel to the positioning axis; and
 locking means suitable for being actuated to prevent the two moving pieces from moving relative to each other.

The mount of the invention is original in particular in that it has two moving pieces that move along a positioning axis, it being possible to prevent these two pieces from moving relative to each other, firstly by retaining means, and subsequently by locking means.

The design of the retaining means makes it possible to determine a force threshold beneath which the two moving pieces remain secured to each other, and above which the two moving pieces move relative to each other.

Thus, it can be ensured that the two moving pieces move relative to each other while an operator is positioning the part relative to its surroundings by exerting forces on said part that are sufficient to move it, and thus put it exactly into position relative to its surroundings. This positioning can be performed, for example, with the help of spacers bearing against parts that are adjacent to the part that is to being positioned.

Once positioned in this way, the part may be subjected to internal stresses which generate forces tending to move it into an unsuitable position. The retaining means of the mount must be strong enough to ensure that the resilient return forces generated by the part remain below the above-mentioned threshold.

In a particular embodiment of the invention, the retaining means define two thresholds: a first threshold for forces exerted in a first direction; and a second threshold for forces exerted in a second direction, opposite to the first.

The first direction is the direction in which the part moves towards the support, and the second direction is the direction in which the part moves away from the support.

In other words, in the first direction, the part is being pushed and in the second direction it is being pulled.

In a first variant of the mount of the invention, the first and second thresholds are equal.

This variant is simple to adjust. Nevertheless, in some cases, resilient return of the part can give rise to forces that are very high, and it is then preferable for the first threshold to be lower than the second threshold so that only the second threshold is greater than the resilient return forces. Thus, a user pushing the part must overcome the resilient return force plus the force opposed by the retaining means, but does not need to supply force greater than the sum of the resilient return force plus the first threshold.

In a particular embodiment, the retaining means between the two moving pieces of the sliding mount are constituted by serrations formed in facing bearing surfaces of the two moving pieces, and by resilient means pressing said bearing surfaces against each other.

The serrations may be symmetrical, which corresponds to the situation in which the first and second thresholds are equal.

The serrations may also be asymmetrical so that the second threshold is greater than the first.

In a particular embodiment of the invention, the locking means act on the retaining means by increasing the threshold above which a force tending to cause the part to slide over the support is capable of releasing the two moving pieces.

For example, the locking means may comprise a screw.

In a particular embodiment of the invention, the mount includes, in its moving piece that is to be secured to the part, an energy absorber arranged in such a manner as to absorb the energy of impacts corresponding to impacts against the part.

Thus, the mount in this embodiment of the invention provides a solution to the problem of the injuries that may be suffered by a pedestrian whose head strikes the bodywork part in the event of a collision with the vehicle.

In another embodiment of the invention, compatible with the above embodiments, the mount includes a fuse zone for separating the support part in the event of a front impact of the vehicle against an obstacle, also known as a "Danner impact".

In this embodiment, the invention seeks to provide a mount which deals with the problem of the bodywork part being damaged in the event of the vehicle impacting an obstacle.

In a particular embodiment of the invention, the mount is arranged in such a manner that in addition to adjustment in the positioning direction, it allows the part to slide relative to the support in a sliding direction which is preferably substantially perpendicular to the positioning direction.

Thus, the mount constitutes a sliding mount which is adapted to mounting bodywork parts made of plastics material on the structure of a vehicle.

The present invention also provides a method of mounting a part on a support by means of a mount as described above, the method being characterized in that it consists in:

securing one of the moving pieces to the part and the other moving piece to the support;

moving the part along the positioning axis by exerting a force greater than the threshold on said part; and once the part is properly positioned relative to its surroundings, actuating the locking means in such a manner as to prevent the two moving pieces from moving relative to each other.

In a preferred implementation, the moving pieces are secured to the part and to the support by initially fixing the mount assembly to the part, and subsequently securing said part fitted with the mount to the support.

In this manner, the amount of handling needed on the mount is minimized, and the mount requires no special preparation. For example, if the part is a bodywork fender, the fender is prepared away from the vehicle assembly line and the assembly comprising the fender and the mount is put into place on the structure of the vehicle.

The method of the invention is particularly advantageous in that it avoids any need for the operator to find access to the mount which is often difficult and sometimes even impossible while simultaneously exerting sufficient force on the part to position it.

The operator acts on the part in order to position it and by means of the invention the part retains its position memory, i.e. it stays in position after the operator ceases to exert the force.

Thereafter, the operator can act freely on the locking means so that the two moving pieces of the mount are definitively prevented from moving relative to each other.

This method is particularly advantageous in mounting a bodywork part on a motor vehicle, for example a front fender on a structural part of said vehicle, the vehicle having an opening member, for example an engine compartment hood, covering said structural part and giving access to the mount when it is opened.

This method is characterized in that it consists in:

securing one of the moving pieces of a mount as described above to the bodywork part;

opening the opening member to give access to the structural part;

securing the other moving piece of the mount to the structural part;

closing the opening member;

moving the bodywork part along the positioning axis to position it accurately relative to its surrounding;

opening the opening member to give access to the mount; and actuating the locking means to prevent the two moving pieces from moving relative to each other.

When applied particularly to a front fender which needs to be positioned relative to an engine compartment hood, the method consists in:

securing a mount to one of the moving pieces;

opening the hood to give access to the structural part;

securing the other moving piece of the mount to the structural part, the mount being oriented in such a manner that the positioning axis is substantially perpendicular to the longitudinal direction of the vehicle;

closing the hood;

optionally placing spacers between the facing edges of the hood and the fender;

moving the fender towards the hood so as to position it accurately relative to said hood;

opening the hood so as to give access to the mount; and actuating the locking means to prevent the two moving pieces from moving relative to each other.

It will be understood that in this particular application of a front fender to be positioned relative to the hood, the sliding mount and the mounting method of the invention are particularly advantageous since the user does not need to hold the fender once it has been positioned relative to the hood. This leaves the user free to open the hood and to actuate the locking means in order to block the two moving pieces of the sliding mount definitively so as to prevent the fender from moving away from its proper position.

Advantageously, while the fender is being secured to the corresponding moving piece, said moving piece is already assembled to the other moving piece for securing to the structural part, such that the other moving piece is subsequently secured to the structural part by fitting the fender carrying the mount assembly to said structural part.

In order to make the invention easier to understand, there follows a description of an embodiment given by way of non-limiting example and made with reference to the accompanying drawings, in which:

FIG. 7(a) is a view of a symmetrical serration on bearing surface 22a and FIG. 7(b) is a view of an asymmetrical serration on bearing surface 22a.

Figure 1:
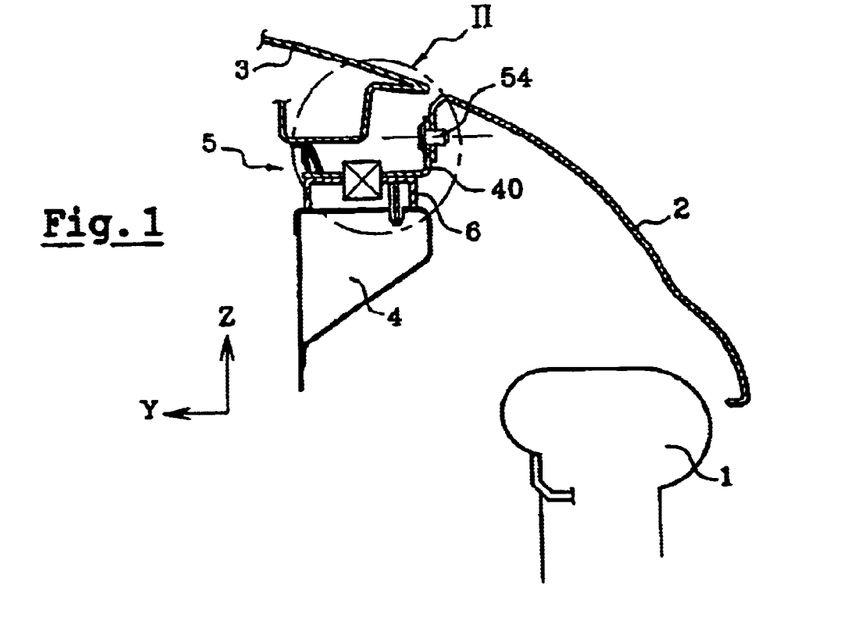
FIG. 1 is a vertical section through a region of a motor vehicle situated above a front left wheel of said vehicle.

In the vicinity of its front wheel 1, the vehicle comprises a fender 2 which needs to be positioned relative to three surrounding bodywork parts, specifically: along its rear edge, a front door (not shown); along its top edge, a hood 3; and along its front edge, a bumper (not shown).

The fender 2 needs to be positioned properly relative to those surrounding parts, and in particular relative to the hood 3.

For this purpose, the fender 2 is mounted on the structure of the vehicle (represented in this case by a top side rail 4) by means of a sliding mount 5 of the invention.

Figure 2:
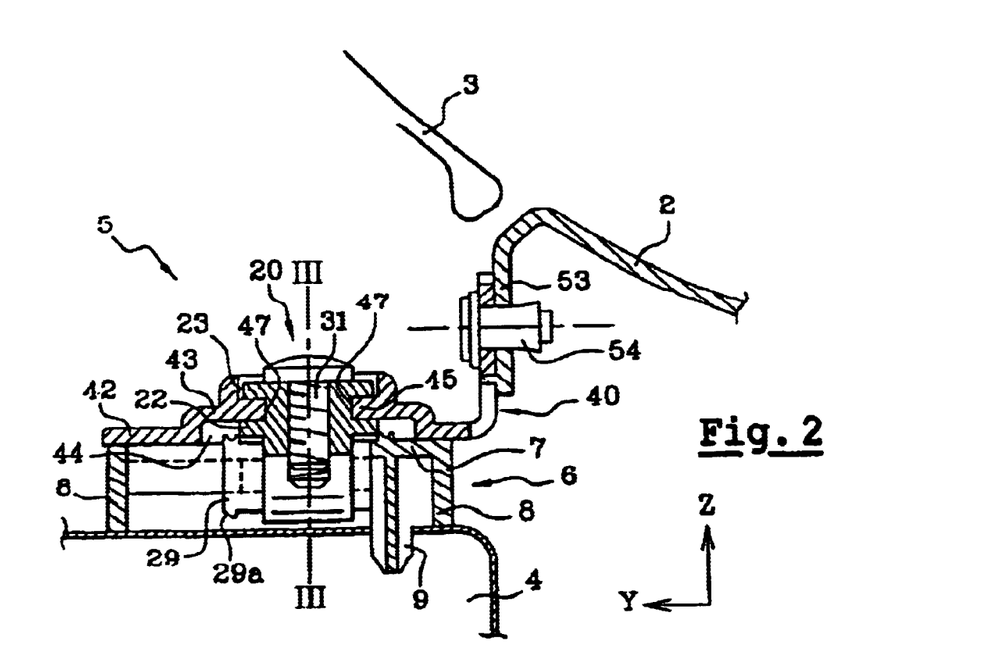
FIG. 2 is a close-up view of zone II of FIG. 1.

This mount 5 comprises a baseplate 6 of plastics material which is made up of a plane platform 7 extending parallel to the side rail and two elongate flanges 8 which leave an empty space above the side rail.

The baseplate 6 has a positioning peg 9 and two snap-fastening tongues 10 projecting from the bottom face of its platform 7. The peg 9 is situated in the middle of the baseplate 6 and penetrates into an orifice 11 provided for this purpose in the top side rail 4, while the snap-fastening tongues 10 situated at the two longitudinal ends of the baseplate penetrate into openings 12 provided for this purpose in the side rail 4 and catch resiliently against retaining surfaces 13 set back from the outside surface of the side rail 4, inside it, so as to secure the baseplate 6 to the side rail 4 without any risk of some object accidentally releasing the tongues 10, e.g. in the event of an impact.

It can be seen that the positioning and fixing of the baseplate 6 on the side rail 4 presents no difficulty and can be performed very quickly without requiring tooling.

Figure 6:
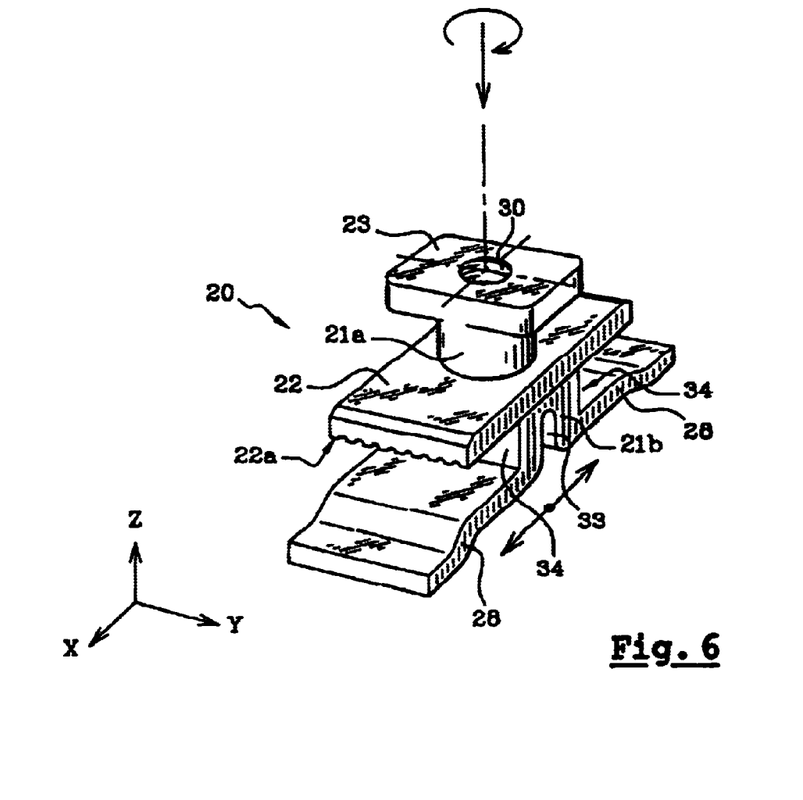
FIG. 6 is a perspective view of a sliding lug shown on its own.
Figure 7A:
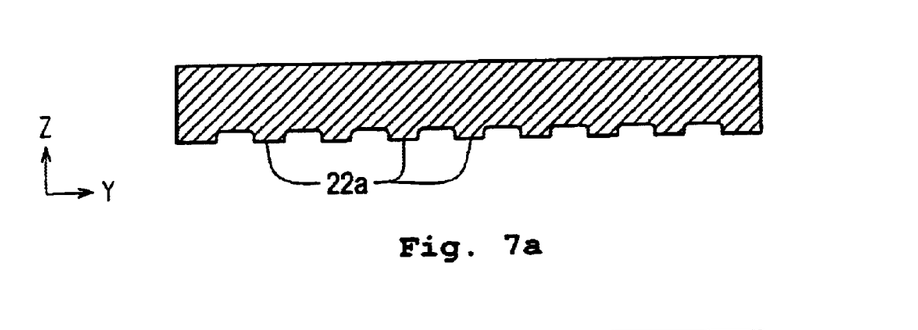
Figure 7B:
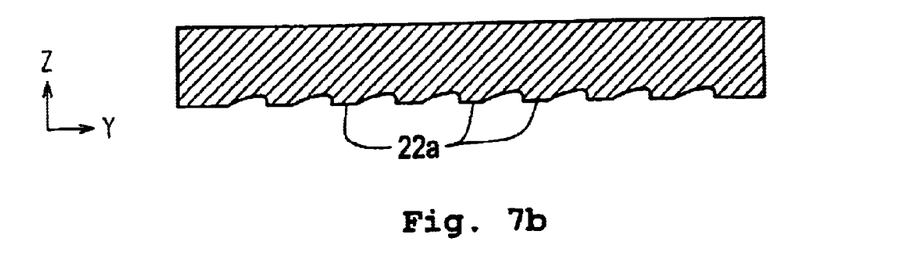

A sliding lug 20 shown on its own in FIG. 6 is secured to the baseplate 6. This lug 20 comprises a body 21 having a top half 21a which is circularly cylindrical and a bottom half 21b which is prismatic.

These two halves 21a and 21b are united via a middle collar 22 of rectangular shape.

At the top of the body 21, a second rectangular collar 23, referred to below as the "top" collar, extends parallel to the middle collar 22. Its width is equal to the diameter of the cylindrical half 21a of the body and its length extends in the transverse direction Y of the vehicle.

The long sides of the middle collar 22 lie in the same vertical planes as the short sides of the top collar. The length of the middle collar extends in the longitudinal direction of the vehicle.

The sliding lug 20 bears against the baseplate 6 via the middle collar 22 whose bottom face 22a constitutes a bearing surface.

Figure 4:
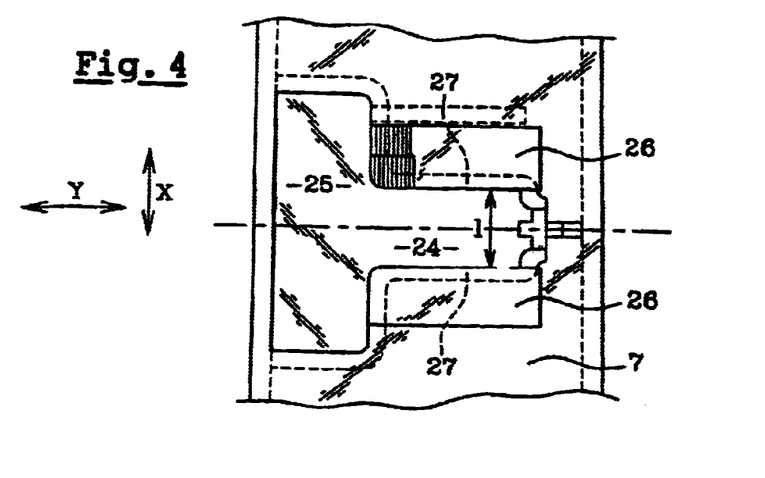
FIG. 4 is a view of FIG. 2 as seen from above.
Figure 5:
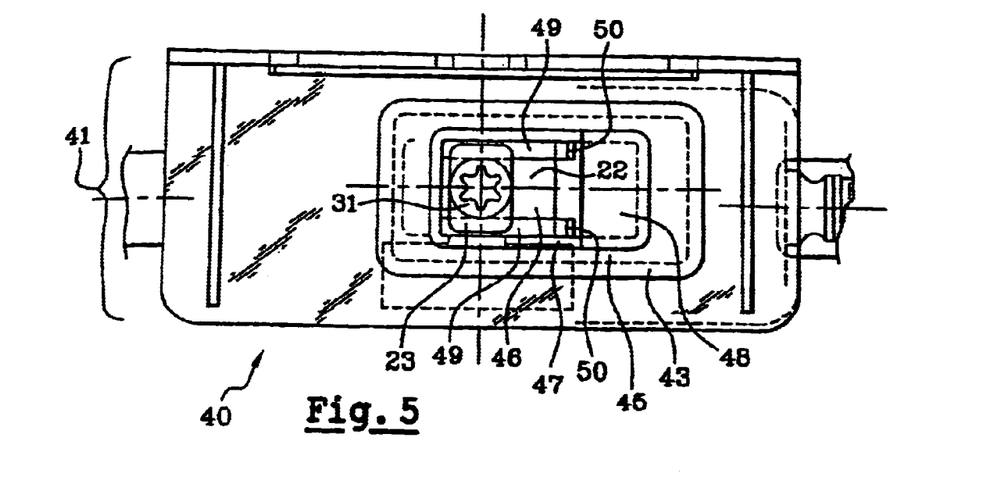
FIG. 5 is a view of FIG. 3 as seen from above.

As can be seen in FIG. 4, a slot 24 passes through the platform 7 of the baseplate. Its width l is slightly greater than the width of the bottom half 21b of the body, and its length extends in the transverse direction Y of the vehicle.

Given the dimensions of this slot 24, the sliding lug 20 is capable of moving only in transverse translation (in the Y direction) by its bottom half 21b sliding in said slot.

The slot 24 is open at one of its ends leading to a cutout 25 in the platform 7 and of dimensions suitable for enabling the bottom half of the sliding lug to be inserted.

Once the sliding lug 20 has been inserted in the slot 24, the middle collar 22 bears against the platform 7 on either side of the slot in strip-shaped regions 26 constituting a bearing surface facing the bearing surface 22a of the middle collar 22.

Serrations are formed in the two facing bearing surfaces 22a and 26, said serrations being in the form of stripes extending in the longitudinal direction X of the vehicle. These stripes oppose displacement of the sliding lug 20 in the transverse direction Y along the slot 24 in the baseplate.

It will be understood that in order to overcome resistance from the stripes, it is necessary to allow the facing surfaces of the middle collar and of the baseplate to move a little away from each other so as to disengage the serrations, or else the serrations must be deformed. In both cases, it is necessary to provide a force that increases with increasing bearing force of the middle collar against the baseplate.

Figure 3:
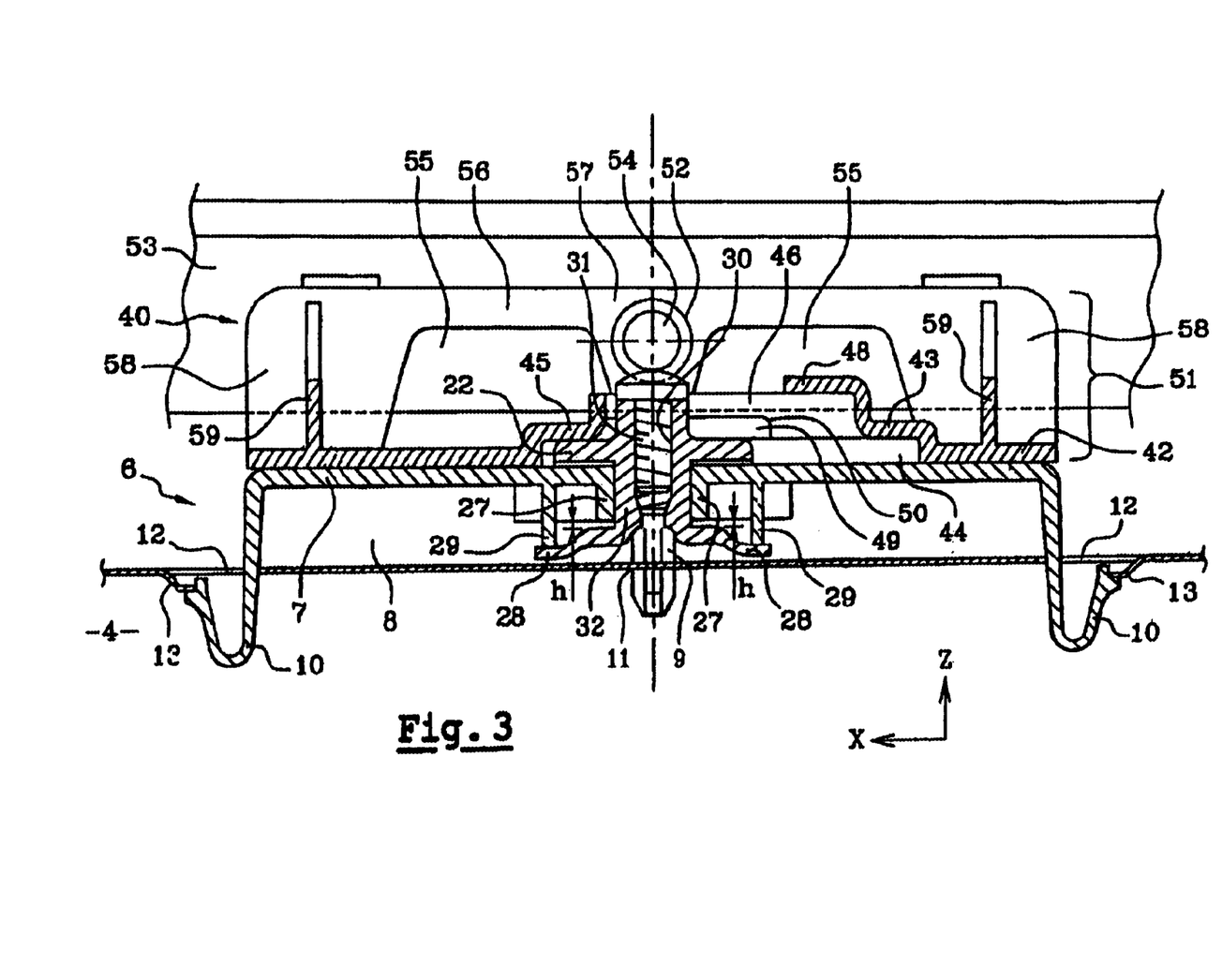
FIG. 3 is a section view on III—III of FIG. 2.

As can be seen in FIG. 3, the slot 24 in the baseplate has rims 27 on either side which guide the sliding lug 20 while holding it substantially perpendicular to the platform 7 of the baseplate.

Starting from the bottom end of the prismatic bottom half 21b of the body, two resilient tongues 28 extend longitudinally in opposite directions. Each tongue 28 is staircase-shaped and of thickness that tapers going away form the base of the body towards the end of said tongue.

In the baseplate 6, two ribs 29 extend downwards from the platform 7, parallel to the rims 27 of the slot 24 so as to be in register with the free ends of the two resilient tongues 28. Each rib has an end chamfer 29a causing a resilient tongue 28 to be deformed and engaged when the sliding lug passes from the cutout 25 to the slot 24.

Each resilient tongue 28 thus bears against a rib 29 while it is spaced apart a little from the rim 27 of the slot at the base of the cylindrical body, by clearance h which allows the sliding lug 20 to move axially in the vertical direction Z with the said tongues being deformed a little more elastically.

As explained above, in order to move the sliding lug 20 in the slot 24 it is necessary for the serrations of the two facing bearing surfaces 22a and 26 of the middle tongue 22 and of the platform 7 to be disengaged, and this is made possible by lifting the lug through the height h which is greater than the depth of the serrations.

The function of the resilient tongues 28 is thus to retain the sliding lug 20 in the baseplate 6 and to press the two bearings surfaces 22a and 26 against each other with a given level of force which determines a first threshold of resistance to displacement of the lug in the slot.

In other words, in this configuration of the sliding lug, it can be moved in the positioning direction Y only by exerting a force on the lug which is greater than the above-mentioned resistance threshold.

In a particular embodiment of the invention, the retaining means define two thresholds: the first threshold for forces exerted in a first direction; and a second threshold for forces exerted in a second direction, opposite to the first.

In a first variant of the mount of the invention, the first and second thresholds are equal.

In a second variant of the mount of the invention, the first threshold is less than the second threshold.

In a particular embodiment, the retaining means between the two moving pieces of the sliding mount are constituted by serrations formed in facing bearing surfaces of the two moving pieces, and by resilient means pressing said bearing surfaces against each other.

The serrations may be symmetrical, which corresponds to the situation in which the first and second thresholds are equal.

The serrations may also be asymmetrical so that the second threshold is greater than the first.

In FIG. 2, it can be seen that each rib 29 extends transversely over a length that is substantially equal to the length of the slot 24, so that the resilient tongues 28 can bear against the ribs 29 in all positions of the sliding lug 20 within the slot 24.

The body 21 is pierced axially by a central bore 30 for receiving a locking screw 31 which is engaged therein from the top end of said bore.

At its bottom end, the bore has two conical bearing surfaces 32 which reduce its cross-section. These two bearing surfaces 32 are situated in mutually opposite directions along the longitudinal axis X.

The prismatic bottom portion 21b of the body is also split at 33 starting from its bottom end, as can be seen in FIG. 6, thereby enabling it to increase the width of its base to a width greater than the width l of the slot. The split 33 opens out into the bore 30.

The prismatic shape of the bottom half 21b of the body associated with a base that can be further enlarged makes it easier to ensure that the lug 20 is prevented from moving in the slot 24.

When the locking screw advances in the bore as it is screwed home, it pushes the conical bearing surfaces 32 of said bore outwards and the base of the prismatic bottom half 21b of the body becomes enlarged by the split 33 widening, and said prismatic half becomes blocked in the slot, bearing against the rims 37 thereof. The grained side faces 34 of the body improve this blocking and oppose any sliding of said faces against the rims 27.

In addition, the widening of the body at the split 33 tends to engage said body further into the baseplate and thus increases the force with which the two facing bearing surfaces 22a and 26 are pressed against each other.

It will be understood that tightening the locking screw determines the force against which the sliding lug will stay in position in the slot.

Thus, the further the locking screw moves down in the bore, the more the sliding lug is prevented from moving relative to the baseplate.

The resistance of the lug to displacement is defined by a new threshold for the force that needs to be exerted on the lug in order to displace it in spite of the combined effects of the serrations and of the grained faces. This new threshold depends directly on the extent to which the locking screw is tightened.

In FIGS. 2 to 5, the sliding lug is shown blocked against the baseplate, the locking screw being fully engaged in the bore.

In the meaning of the present invention, the baseplate 6 and the sliding lug 20 constitute the two moving pieces of the mount.

It should be observed that the top and bottom collars 23 and 22 of the sliding lug define between them a gap that forms a slideway in the longitudinal direction X.

The sliding function of the mount which enables the fender to expand in the longitudinal direction of the vehicle is provided by this slideway and by a bracket 40 described below.

The horizontal part 41 of the bracket 40 is constituted by a plate 42 having a first projecting rectilinear setback 43 formed therein to leave an empty gap 44 above the baseplate 6 in order to receive the middle collar 22.

This first setback 43 has a plane wall 45 pierced in its middle by a rectangular opening 46 defined by a rib 47.

Said opening 46 is covered at one end over about one-third of its length by a plane wall 48 which leaves a gap between itself and the baseplate 6 which is sufficient to receive the top half of the sliding lug.

The remaining two-thirds of the opening 46 are provided with longitudinal ramps 49 of thickness very slightly smaller than the distance between the collars 22 and 23 whose facing edges are spaced apart by a distance that is constant and very slightly greater than the diameter of the cylindrical top half 21a of the sliding lug.

It will be understood that these ramps can slide between the two collars of the lug, thus implementing the desired sliding function between the bracket 40 and the baseplate 6.

The difference in height in the Z direction between the plane wall 48 and the ramp 49 is sufficient to allow the bracket to cover the sliding lug 20 in register with said wall 48, and then slide so as to bring its two ramps 49 between the collars 22 and 23. Engaging the ramps between the collars is made easier by chamfers 50 at the ends of the ramps that face towards the wall 48.

Thus, this arrangement of the horizontal portion 41 of the bracket allows the bracket 40 to slide relative to the sliding lug 20 along the longitudinal direction X of the vehicle.

The vertical portion 51 of the bracket is a plate in which there is provided an orifice 52 for securing it to an inwardly-directed margin 53 of the fender 2, in this case by means of a rivet of plastics material 54.

As can be seen in FIG. 3, said plate is cut out in its central region where it has two notches 55 which leave only a narrow strip of material 56 along the top edge of the bracket and a fixing plate 57 in the middle of said strip, this plate being pierced by an orifice 52 for fixing to the fender.

Thus, the vertical portion of the bracket is connected to the horizontal portion thereof only via its ends 58 which form a right angle with said horizontal portion. Each of these ends is also stiffened by a transverse rib 59 extending perpendicularly to the horizontal and vertical portions 41 and 51.

The vertical portion of the bracket which is weakened by the notches 55 performs two functions, firstly a function of absorbing impacts having a vertical component, of the type involving the head of a pedestrian, and secondly a function of protecting the fender and the sliding mount by destroying the bracket.

The first function of absorbing impacts is achieved by the elasticity of the narrow strip 56 of material which is of a width that is small enough to allow deformation in the vertical direction.

The fuse function is likewise the result of the very small width of the strip of material, which cannot withstand a compression or traction force in the longitudinal direction.

The bracket 40 as a whole including its slideway-forming arrangement in the horizontal portion can slide freely relative to the sliding lug 20 in the longitudinal direction of the vehicle.

It can be seen that tightening the locking screw 31 has no effect on this sliding because the locking screw does not change the spacing between the top and bottom collars.

The sliding of the bracket in the longitudinal direction is also facilitated by the fact that its horizontal portion 41 bears against the platform 7 of the baseplate which provides a smooth surface of plastics material, such that sliding the bracket involves surface friction between two smooth plastics surfaces. It will be observed that that disposition constitutes a genuine advantage compared with prior art sliding mounts in which the moving part slides directly on the side rail.

It will thus be understood that the longitudinal sliding of the fender relative to the structure of the vehicle is made possible by the pair of components constituted by the bracket and the sliding lug, while transverse adjustment of the position of the fender relative to the surrounding bodywork part is made possible by the pair of components constituted by the sliding lug and the baseplate.

There follows a description of the manner in which an operator positions the fender relative to the bodywork parts on a vehicle assembly line. At this stage, the vehicle is already fitted with its engine hood and its front doors. The fender is positioned relative to those adjacent bodywork parts.

The sliding mount of the invention is initially assembled.

For this purpose, the sliding lug 20 is inserted into the slot 24 of the baseplate and the top collar 23 of the sliding lug is inserted into the opening 46 of the horizontal portion 41 of the bracket in register with the wall 48. The bracket is then slid longitudinally in the X direction to bring the ramps 49 between the top and middle collars 23 and 22 of the sliding lug.

The assembled mount is then mounted on the fender 2 by means of the rivet 52 clamping the vertical portion 51 of the bracket against the margin 53 of the fender.

In the assembled mount, the locking screw 31 is merely engaged in the axial bore 30 of the sliding lug 30 but it is not screwed fully home so that its end does not bear against the conical bearing surfaces 32 oft the bore. The sliding lug is thus held in position in the slot 24 of the baseplate 6 solely by the resilience of the tongues 28.

These tongues exert a small amount of traction on the sliding lug, thus preventing it from moving in the slot because of the facing stripes on the bearing surfaces 22a and 26 of the lug and of the baseplate, providing the transverse force exerted on the lug does not exceed a certain threshold.

Given the symmetrical shape of the stripes, this threshold is the same regardless of whether the force is exerted on the lug towards the inside or towards the outside of the vehicle.

The sliding lug 20 is positioned at the end of the slot 24 that is closest to the fender so as to make it possible subsequently to move it along the entire stroke made available by said slot.

Spacers (not shown) are positioned on the hood and on the front door so as to determine the clearance that needs to be left between the fender and the hood and the clearance that needs to be left between the fender and the door. This clearance needs to be constant and to satisfy predetermined criteria.

The fender 2 and the mount already mounted to the fender are brought up to the vehicle. The baseplate 6 is then snap-fastened to the side rail 4 using the positioning peg 9 and the snap-fastening tongues 10.

Because the mount has already been positioned with the sliding lug 20 in its end-of-stroke position in the slot, the fender should then be at a distance from the spacers. The operator can then merely exert pressure on the fender in the transverse direction so as to cause it to press against the spacers.

During this movement, the sliding lug moves in the slot since the force exerted by the operator on the fender gives rise to force being exerted by the sliding lug relative to the baseplate that is greater than the threshold at which the stripes of the middle collar and of the baseplate separate.

Nevertheless, this threshold is greater than the force exerted by the fender on the mount when the operator lets go and ceases to exert positioning pressure.

All that then remains is to open the hood in order to remove the spacers and tighten the locking screw, which screw then exerts pressure on the conical bearing surfaces of the bore and splays open the base of the prismatic bottom half 21b of the sliding lug whose side faces 34 are prevented from moving relative to the rims 27 of the slot.

By means of this operation, the operator raises quite considerably the threshold beyond which the sliding lug is capable of sliding in the slot.

In other words, this threshold is made to be higher than any force to which the fender is likely to be subjected during the lifetime of the vehicle and it becomes practically impossible to move the sliding lug in the slot.

The fender is thus definitively positioned relative to the hood.

Independently of this clamping, the sliding lug cooperates with the bracket to form a pair of parts that allow the fender to slide longitudinally in the same manner as any known sliding mount.

The fender might be subjected to impacts of two kinds.

If a pedestrian's head strikes the top of the fender, then the fender is subjected to a sudden force having a vertical component and as a result the narrow strip 46 of material in the vertical portion of the bracket deforms and absorbs a fraction of the impact energy.

If the vehicle is subjected to a front impact, then the bumper transmits a force to the fender that is directed towards the rear end of the vehicle and the fender tends to bulge. Under such circumstances, the narrow strip of material in the vertical portion of the bracket snaps and the fender is separated from the structure of the vehicle. Only the bracket is damaged, thereby preserving not only the fender, but also the baseplate and the sliding lug.

Naturally, the embodiment described above does not present any limiting character and can be modified in any desirable manner without going beyond the ambit of the invention.

What is claimed is:

1. A method of assembling a bodywork part to a support of a motor vehicle by a mount, the mount comprising:

two pieces that are movable relative to each other parallel to a positioning axis, one piece being for securing to the part and the other to the support;

a retaining device which prevents the two moving pieces from moving relative to each other and which releases them only when the part exerts against the support a force that is greater than a given threshold in a direction parallel to the positioning axis; and a locking device suitable for being actuated to prevent the two moving pieces from moving relative to each other;

the method comprising:

securing one of the moving pieces of the mount to the bodywork part;

opening an opening member to give access to the support;

securing the other moving piece of the mount to the support;

closing the opening member;

moving the bodywork part along the positioning axis to position it accurately relative to its surrounding;

opening the opening member to give access to the mount; and actuating the locking device to prevent the two moving pieces from moving relative to each other.

2. A method of assembling a motor vehicle front fender to a support of said vehicle by a mount, the vehicle having an engine compartment hood covering said support, and the mount comprising:

two pieces that are movable relative to each other parallel to a positioning axis, one piece being for securing to the part and the other to the support;

a retaining device which prevents the two moving pieces from moving relative to each other and which releases them only when the part exerts against the support a force that is greater than a given threshold in a direction parallel to the positioning axis; and a locking device suitable for being actuated to prevent the two moving pieces from moving relative to each other, the method comprising:

securing the mount to one of the moving pieces;

opening the hood to give access to the structural part;

securing the other moving piece of the mount to the support, the mount being oriented in such a manner that the positioning axis is substantially perpendicular to a longitudinal direction of the vehicle;

closing the hood;

moving the fender towards the hood so as to position it accurately relative to said hood;

opening the hood so as to give access to the mount; and actuating the locking device to prevent the two moving pieces from moving relative to each other.

3. A method according to claim 2, wherein while the fender is being secured to the corresponding moving piece, said moving piece is already assembled to the other moving piece for securing to the support, such that the other moving piece is subsequently secured to the support by fitting the fender carrying the mount assembly to said support.

* * * * *